United States Patent Office 2,841,573
Patented July 1, 1958

2,841,573

FLUOROCARBON VINYL-TYPE ESTERS AND POLYMERS

Arthur H. Ahlbrecht, White Bear Township, Ramsey County, and Harvey A. Brown, Oakdale Township, Washington County, Minn., assignors to Minnesota Mining & Manufacturing Company, St. Paul, Minn., a corporation of Delaware No Drawing. Application December 29, 1955
Serial No. 556,074

4 Claims. (Cl. 260—79.3)

This invention relates to our discovery of a new and useful class of fluorocarbon vinyl-type esters and their polymers. The invention provides polymers which have notable utility for sizing cloth to impart both water repellency and resistance to absorption and staining by oils and greases. These esters and their polymers also have utility for other surface treating or coating usages to obtain both water and oil repellency, and the esters have utility as surface active agents.

More particularly, these novel ester compounds are vinyl esters and allyl esters of perfluoroalkanesulfonamido alkylenemonocarboxylic acids which have in the molecule a perfluorocarbon "tail" containing 4 to 12 fully fluorinated carbon atoms.

The vinyl esters have the equivalent general formulas:

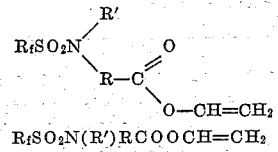

$$R_fSO_2N(R')RCOOCH=CH_2$$

The allyl esters are also vinyl-type esters, having a terminal vinyl group (—CH=CH$_2$), but are the next-higher homologues of the corresponding simple vinyl esters shown in the above formulas. They have in the molecule a methylene linking group to which the terminal vinyl group is joined, as shown by the equivalent general formulas corresponding to those shown above:

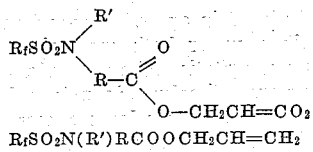

$$R_fSO_2N(R')RCOOCH_2CH=CH_2$$

In these formulas $R_f$ is a perfluoroalkyl group containing 4 to 12 carbon atoms (which provides the perfluorocarbon "tail"), R is an alkylene bridging group containing 1 to 12 carbon atoms, and R' is a hydrogen atom or an alkyl group containing 1 to 6 carbon atoms (methyl, ethyl, propyl, butyl, amyl or hexyl).

The aforesaid acids of which these esters are derivatives, have the formula:

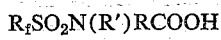

These acids may be regarded as N-substituted derivatives of amino acids of the monoamino-monocarboxylic type (H$_2$N—R—COOH) in which one N-bonded hydrogen atom is replaced by a perfluoroalkanesulfonyl group (R$_f$SO$_2$—) and the other hydrogen atom may or may not be replaced by a short-chain alkyl group. An example of such fluorocarbon acid is N-ethyl, N-perfluorooctanesulfonyl glycine, having the formula:

This compound is so named because it may be regarded as a derivative of glycine, an amino acid having the formula H$_2$NCH$_2$COOH. It has a terminal perfluoroalkyl group which provides a perfluorocarbon "tail" containing eight fully fluorinated carbon atoms.

The perfluorocarbon "tail" structure may include an oxygen atom linking together two perfluorinated carbon atoms, or a nitrogen atom linking together three perfluorinated carbon atoms, since these linkages are very stable and do not impair the inert and stable fluorocarbon characteristic of the structure (cf., U. S. Patents Nos. 2,500,388 and 2,616,927).

Perfluoroalkanesulfonyl compounds useful as starting compounds for making the present vinyl-type esters have been described in the copending application of T. J. Brice and P. W. Trott, S. N. 448,784, filed Aug. 9, 1954, and issued as Patent No. 2,732,398 on Jan. 24, 1956.

It is of critical importance that the perfluorocarbon "tail" contain at least four carbon atoms, and the preferred number is six to ten. A terminal fluorocarbon chain of this minimum length is required in order to insolubilize and render both hydrophobic and oleophobic the perfluoroalkanesulfonamido end of the molecule. Increase in length of this "tail" decreases solubility still further and enhances the degree of water and oil repellency imparted to polymers of the present vinyl and allyl esters.

The length of the bridging alkylene group represented by —R— in the preceding ester and acid formulas, which links the carboxylate group to the sulfur-bonded nitrogen atom, can be varied to thereby modify solubility and surface properties of the esters and their polymers, as well as other physical properties of the polymers such as melting point and flexibility. The N-substituted alkyl side group can also be employed and varied to modify properties.

Thus the general molecular structure of the present vinyl-type ester compounds can be varied to obtain polymerizable monomers having specifically different characteristics, so that monomers and polymers having optimum properties for a given end use can be selected.

The esters may be employed as intermediates for making derivatives. In particular, the vinyl group provides a reactive terminal group that can be availed of in making derivatives as is well understood by those skilled in the vinyl chemistry art. The esters may be employed as surface active agents, and may be used in unpolymerized form as surface coating or treating agents to impart a hydrophobic and oleophobic characteristic.

The esters may be employed as polymerizable monomers to form novel fluorocarbon homopolymers and heteropolymers containing a multiplicity of fluorocarbon ester units which each have a perfluorocarbon "tail" ($R_f$) containing from 4 to 12 fully fluorinated carbon atoms. The skeletal structure of the polymer molecule includes a recurring fluorocarbon ester unit of the following formula when the monomer is a vinyl ester:

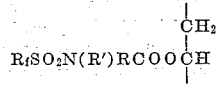

The following is the corresponding formula of the recurring fluorocarbon ester unit when the monomer is an allyl ester:

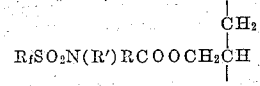

Copolymerization of our vinyl and allyl esters results in copolymers thereof that include both the above types of recurring fluorocarbon ester units in the polymer molecule.

Bulk, solution and emulsion polymerization procedures can be used, employing peroxide catalysts.

The fully polymerized vinyl and allyl homopolymers are clear, colorless, water-repellent and oil-repellent, thermoplastic solids. They are insoluble in hydrocarbons and in non-polar organic solvents and are highly insoluble in water. They are soluble in fluorinated solvents, such as fluorocarbon acids and esters, benzotrifluoride, and xylene hexafluoride.

Coatings can be applied from solution or emulsion to provide firmly bonded surface coatings or sizings on cloth, paper, leather, glass and ceramic articles, lithic materials, and metals. Due to orientation of the polymer molecules, the fluorocarbon "tails" provide an inert fluorocarbon-like outer surface which is both hydrophobic and oleophobic. Drops of water and drops of oil deposited on the surface will remain or run off rather than spreading and wetting the surface. In treating fibrous materials such as cloth and paper, the sizing need only be sufficient to provide an extremely thin coating on the fibers, which does not appreciably affect the appearance, flexibility, strength or porosity of the material. The sized cloth or pare is rendered resistant to absorption and staining by oily or greasy materials, as well as being rendered repellent to water. Both oily and watery stains can be wiped off.

In addition to homopolymers and copolymers made exclusively from the aforesaid vinyl and allyl ester monomers, novel copolymers (heteropolymers) may be made by interpolymerizing the present ester monomers with polymerizable monomers of other kinds which contain an ethylenic linkage. Examples of the latter are maleic anhydride, acrylonitrile, vinyl chloride, vinyl acetate, vinyl silicones, styrene, methyl acrylate, methyl methacrylate, ethylene, isoprene and butadiene; both as to non-halogenated and halogenated varieties. This makes possible the production of many types of polymers having different physical properties, wherein the polymer molecules include fluorocarbon ester units providing perfluorocarbon side-chain "tails" of the type mentioned above.

The properties of the polymer masses can also be varied by the use of plasticizers (such as fluorocarbon esters), and by compounding with carbon black and other finely divided solid materials such as zinc oxide. The stiffness or hardness of the polymer mass can be increased by including a small proportion of a polyfunctional compound at the time of polymerization to cause crosslinking between the skeletal chains and thereby form a three-dimensional network. The use of various expedients for modifying the properties of polymer masses is understood by those skilled in polymer chemistry and need not be elaborated upon.

The fundamental contribution of the present invention is the discovery of the aforesaid novel fluorocarbon vinyl and allyl esters and of their utility as polymerizable monomers for making novel and useful polymers.

The present vinyl-type esters are derivatives of the aforesaid perfluoroalkanesulfonamido alkylenemonocarboxylic acids, and may be prepared by esterification of such acids employed as starting compounds. These acids are described in some detail and are claimed in the copending application of one of us, H. A. Brown, filed of even date herewith, S. N. 556,047, and since issued as Patent No. 2,809,990 on Oct. 15, 1957. The preferred process of making such acids is outlined by the following equations showing the series of steps which can be used in deriving them from corresponding perfluoroalkanesulfonyl fluoride starting compounds (the preparation of the latter by means of an electrochemical fluorination process being described in the aforesaid copending application of Brice and Trott, now Patent No. 2,732,398):

$$R_fSO_2F + R'NH_2 \rightarrow R_fSO_2N(R')H$$
$$R_fSO_2N(R')H + NaOH \rightarrow R_fSO_2N(R')Na$$
$$R_fSO_2N(R')Na + ClRCOOC_2H_5 \rightarrow$$
$$\phantom{R_fSO_2N(R')Na + ClRCOOC_2H_5} R_fSO_2N(R')RCOOC_2H_5$$
$$R_fSO_2N(R')RCOOC_2H_5 + NaOH \rightarrow$$
$$\phantom{R_fSO_2N(R')RCOOC_2H_5 + NaOH} R_fSO_2N(R')RCOONa$$
$$R_fSO_2N(R')RCOONa + H_2SO_4 \rightarrow R_fSO_2N(R')RCOOH$$

In the above formulas, $R_f$, $R'$ and $R$ have the same meanings as in previous formulas.

This process thus consists in preparing a perfluoroalkanesulfonamide, converting this to a sulfonamide salt, converting the latter to an ester of the desired acid which is then hydrolyzed to a salt of the acid, and hydrolyzing the salt to form the product acid.

The present vinyl-type esters can also be prepared as an intermediate in the above reaction scheme and recovered as such, without making the acid compound. This can be accomplished by employing the third step shown above to prepare the desired vinyl or allyl ester derivative as, for example, by reacting the sulfonamide salt with vinyl or allyl chloroacetate.

The following experimental examples illustrate the preparation of the subject compounds and polymers.

*Example 1*

A one liter flask was charged with 445 grams of N-ethyl perfluorooctanesulfonamide, $C_8F_{17}SO_2NHC_2H_5$, and addition was made of 19.4 grams of sodium dissolved in 300 ml. of methanol. After mixing, most of the methanol was distilled off by heating under reduced pressure. The methanol distillation was completed by adding 454 grams of benzene and heating under reduced pressure to remove the benzene. Then 204 grams of vinyl chloroacetate, $ClCH_2COOCH{=}CH_2$, was added and the mixture was stirred for 4 hours. After 64 hours standing at room temperature, the mixture was refluxed for 2 hours and then filtered. Vacuum distillation and redistillation resulted in a 44% yield of a fraction having a boiling range of 103–109° C. at 0.1 mm. The product was a white waxy water-repellent solid at room temperature, and was identified as the desired vinyl ester:

$$C_8F_{17}SO_2N(C_2H_5)CH_2COOCH{=}CH_2$$

Analysis showed 2.26% nitrogen (2.28% calc.). An infrared spectral absorption analysis was consistent.

Polymerization was effected by charging a heavy-walled "Pyrex" glass ampoule with 1.5 grams of this vinyl ester monomer and 0.015 gram of acetyl peroxide (catalyst) dissolved in 0.060 gram of dimethyl phthalate solvent. To remove any oxygen in the ampoule, the vinyl ester monomer was melted by warming the ampoule. Then the ampoule was frozen in liquid air, evacuated to a pressure of less than 0.1 mm., and sealed while frozen. The sealed ampoule was then warmed until the monomer was melted, and placed in an end-over-end rotator which was immersed in a water bath maintained at 60° C. After 15½ hours of agitation, the ampoule was removed and the contents was dissolved in xylene hexafluoride. The solution was poured into a large excess of methanol to precipitate the polymer, which was filtered out and dried in a vacuum oven at room temperature, yielding 0.95 gram (64% yield). This polymer product was a white thermoplastic powder having a softening point of approximately 70° C. The inherent viscosity was 0.13 (determined from viscosity of a solution of 1.11 grams polymer per liter of xylene hexafluoride solvent).

*Example 2*

A 250 ml. flask was charged with 51.3 grams of N-methyl perfluorooctanesulfonamide, $C_8F_{17}SO_2NHCH_3$, and addition was made of 2.3 grams of sodium dissolved in 50 ml. of methanol. After mixing, most of the methanol was distilled off by heating under reduced pressure. The methanol distillation was completed by adding 50 ml. of benzene and heating under reduced pressure to remove the benzene. After adding 50 ml. of acetone and 2 grams of potassium iodide, addition was made of 24.1 grams of vinyl chloroacetate. An almost immediate reaction was noted. The acetone mixture was refluxed overnight. The salt was filtered out and the mixture was washed with ether and then with water. The water phase was extracted with ether. The ether extracts were combined and the ether evaporated off under reduced pressure. The residue of 45 grams was distilled under vacuum in a small Vigreaux column. The cut boiling at 100–106° C. at 0.2 mm. was recovered in a yield of 20.5 grams. This product was a white waxy water-repellent solid at room temperature and was identified as the desired vinyl ester:

$$C_8F_{17}SO_2N(CH_3)CH_2COOCH=CH_2$$

Analysis showed 2.40% nitrogen (2.34% calc.). The infrared spectral absorption analysis was consistent.

A sample of this vinyl ester monomer was polymerized in a manner similar to that described in the preceding example. A 64% yield of purified polymer was obtained in the form of a white thermoplastic powder having a softening point of 95–100° C. The inherent viscosity was 0.12 (determined from viscosity of a solution of 1 gram polymer per liter of xylene hexafluoride solvent). A transparent colorless solid plastic mass was made by moistening the powdered polymer with acetone and drying to fuse the particles together and eliminate the acetone.

As illustrative of the utility of our polymers for sizing cloth to impart both water repellency and resistance to absorption and staining by oily and greasy materials, the following tests are presented:

Samples of cotton jeans cloth were dipped into a 1% (by weight) solution of the above polymer in xylene hexafluoride solvent and passed through a squeeze roll to remove excess saturant, followed by drying in an oven for 10 minutes at 150° C. Drops of water and drops of oil placed on the surface of the treated cloth remained indefinitely without spreading out and wetting the surface. The high degree of water repellency was shown by a "spray test" (Standard Test Method No. 22–52 published in the 1952 Technical Manual and Yearbook of the American Association of Textile Chemists and Colorists, vol. XXVII, page 136), which gave a rating of 90 as compared with 100 which is the highest possible test rating. It has been found that a severe test of oil repellency is to determine the resistance to penetration by solutions of mineral oil in heptane, which have a greater tendency to penetrate than does mineral oil alone. The higher the proportion of heptane the quicker the penetration. In the case of the above-mentioned treated cotton cloth, it was found that resistance to penetration for at least 3 minutes was obtained with a mineral oil solution containing 45% (by volume) of heptane, which demonstrated excellent resistance to oil.

Excellent water and oil repellency were also exhibited by a similarly treated fabric which was a blend of 55% "Dacron" fibers and 45% worsted (wool) fibers. ("Dacron" is the trademark of the Du Pont Company for drawn polyester fibers produced from a polyester of ethylene glycol and terephthalic acid.)

Water and oil base stains (e. g., from ink, soft drinks, coffee, salad oil, gravy, hair oil, etc.) could be removed from the treated fabrics by blotting and rubbing without leaving a mark. Yet the treatment did not adversely affect the hand, shade, strength or porosity of the fabric and was "invisible" in its effect except as to imparting a combined hydrophobic and oleophobic character.

The insolubility of the polymers in water, hydrocarbons and common organic solvents renders the cloth sizing highly resistant to removal when subjected to such materials, and permits of laundering and of dry cleaning sized fabrics without destroying the effectiveness of the sizing.

Fabrics can also be sized with the polymer in the form of an aqueous latex dispersion, thereby avoiding the use of solvent vehicles.

*Example 3*

To a flask containing 23.0 grams of freshly distilled vinyl acetate and 0.75 grams of mercuric acetate there was added 23.5 grams of N-methyl, N-perfluorooctanesulfonyl 11-aminoundecanoic acid, $$C_8F_{17}SO_2N(CH_3)(CH_2)_{10}COOH$$

The mixture was heated to about 45° C. to form a solution and 0.15 gram of concentrated sulfuric acid was added dropwise with stirring and shaking. As the solution cooled below 35° C. the acid precipitated out. The mixture was allowed to stand for 6 days at room temperature, and then 1.0 gram of sodium acetate was added and the mixture was filtered. The volatiles were evaporated off from the filtrate under reduced pressure and the residue was subjected to vacuum distillation. The cut boiling at 160–166° C. at 0.175 mm. was obtained in a yield of 6 grams. It was a white waxy water-repellent solid and was identified as the desired vinyl ester:

$$C_8F_{17}SO_2N(CH_3)(CH_2)_{10}COOCH=CH_2$$

Analysis showed 45.0% fluorine (45.9% calc.) and 1.91% nitrogen (1.99% calc.). Infrared spectral absorption analysts was consistent.

*Example 4*

A 100 ml. flask provided with a 12 inch distillation column topped with a Barrett trap was charged with 40 grams of N-perfluorooctanesulfonyl glycine, $$C_8F_{17}SO_2NHCH_2COOH$$

10 grams of allyl alcohol, $CH_2=CHCH_2OH$, 0.4 gram of beta-naphthalenesulfonic acid and 35 grams of toluene. The mixture was heated to reflux. The acid slowly dissolved in the toluene. About 2 ml. of water collected in the trap during 3 hours of refluxing. The benzene was removed and the residue was fractionally distilled. The cut boiling at 137–139° C. at 0.5 mm. was redistilled to yield 20 grams of product boiling at 121° C. at 0.175 mm., a light-colored waxy water-repellent material having a melting point of 70–75° C., which was identified as the desired allyl ester:

$$C_8F_{17}SO_2NHCH_2COOCH_2CH=CH_2$$

*Example 5*

Using a procedure essentially the same as described in the preceding example, 10 grams of allyl alcohol was reacted with 40 grams of N-methyl, N-perfluorooctanesulfonyl 11-aminoundecanoic acid, $$C_8F_{17}SO_2N(CH_3)(CH_2)_{10}COOH$$

to obtain 23 grams of product boiling at 173–180° C. at 0.05 mm., which was a white waxy water-repellent material at room temperature. It was identified as the desired allyl ester:

$$C_8F_{17}SO_2N(CH_3)(CH_2)_{10}COOCH_2CH=CH_2$$

A copolymer of this allyl ester and maleic anhydride was prepared as follows:

A 3-necked 50 ml. flask equipped with a stirrer, reflux condenser and gas inlet tube, was charged with 7.38 grams of the allyl ester, 0.98 gram of maleic andydride, and 4.5 grams of toluene. With nitrogen flowing through the system the mixture was brought to reflux to remove oxygen from the system, and was then cooled under nitrogen at 60° C. and 0.0836 gram of benzoyl peroxide was added. The nitrogen flow was stopped and the temperature was raised to 70–73° C. by using an oil bath. The reaction temperature was held at 70° C. for 24 hours, addition was made of a further 0.0836 gram of benzoyl peroxide, and the reaction temperature was raised to 90° C. and held for 4 hours. Then the contents of the flask was poured into 50 grams of methanol and the precipitated polymer was filtered and air dried. The yield was 54%.

The polymer product was a crystalline mass which softened at 94° C. It was insoluble in water and in common organic solvents but was soluble in xylene hexafluoride and in mixtures of methyl ethyl ketone and xylene hexafluoride. It had an intrinsic viscosity of 0.04

(determined from viscosity of a solution of 1 gram of polymer per liter of xylene hexafluoride solvent).

We claim:

1. Fluorocarbon vinyl-type esters of the class consisting of vinyl esters and allyl esters of perfluoroalkanesulfonamido alkylenemonocarboxylic acids; said vinyl esters having the formula:

$$R_fSO_2N(R')RCOOCH=CH_2$$

and said allyl esters having the formula:

$$R_fSO_2N(R')RCOOCH_2CH=CH_2$$

wherein $R_f$ is a perfluoroalkyl group containing 4 to 12 carbon atoms, R is an alkylene bridging group containing 1 to 12 carbon atoms, and $R'$ is of the class consisting of a hydrogen atom and alkyl groups containing 1 to 6 carbon atoms.

2. Solid polymers of fluorocarbon vinyl-type esters specified in claim 1.

3. Articles which have been coated or sized with solid polymers of fluorocarbon vinyl-type esters specified in claim 1.

4. Fabrics which have been sized with solid polymers of the vinyl esters specified in claim 1 so as to have been rendered both water repellent and oil repellent.

No references cited.